US011245761B2

(12) United States Patent
Cheng

(10) Patent No.: US 11,245,761 B2
(45) Date of Patent: Feb. 8, 2022

(54) METHOD, APPARATUS, AND COMPUTER-READABLE STORAGE MEDIUM FOR NETWORK OPTIMIZATION OF CLOUD STORAGE SERVICE

(71) Applicant: Alibaba Group Holding Limited, Grand Cayman (KY)

(72) Inventor: Gang Cheng, Bellevue, WA (US)

(73) Assignee: Alibaba Group Holding Limited, Grand Cayman (KY)

(*) Notice: Subject to any disclaimer, the term of this patent is extended or adjusted under 35 U.S.C. 154(b) by 114 days.

(21) Appl. No.: 16/236,242

(22) Filed: Dec. 28, 2018

(65) Prior Publication Data
US 2020/0213390 A1 Jul. 2, 2020

(51) Int. Cl.
H04L 29/08 (2006.01)
H04L 12/761 (2013.01)
H04L 29/14 (2006.01)
H04L 12/933 (2013.01)

(52) U.S. Cl.
CPC ......... *H04L 67/1097* (2013.01); *H04L 45/16* (2013.01); *H04L 49/15* (2013.01); *H04L 69/40* (2013.01)

(58) Field of Classification Search
CPC . H04L 67/1097; H04L 67/1095; H04L 69/40; H04L 49/15; H04L 67/2814; H04L 41/0677; H04W 88/16; H04W 92/06
See application file for complete search history.

(56) References Cited

U.S. PATENT DOCUMENTS

| 6,963,914 B1* | 11/2005 | Breitbart ............. H04L 67/1095 709/225 |
| 7,830,883 B1 | 11/2010 | Fromm et al. |
| 8,018,938 B1 | 9/2011 | Fromm et al. |
| 8,285,681 B2 | 10/2012 | Prahlad et al. |
| 8,407,190 B2 | 3/2013 | Prahlad et al. |
| 8,799,413 B2 | 8/2014 | Taylor et al. |
| 9,110,837 B2 | 8/2015 | Patel et al. |
| 10,346,259 B2 | 7/2019 | Gokhale et al. |
| 10,455,015 B2 | 10/2019 | Procopio et al. |
| 2012/0110186 A1* | 5/2012 | Kapur ................... G06F 9/5072 709/226 |
| 2013/0151474 A1 | 6/2013 | Wolfe |
| 2013/0318219 A1* | 11/2013 | Kancherla ........... H04L 41/0806 709/222 |

(Continued)

FOREIGN PATENT DOCUMENTS

| CN | 202679422 U | 1/2013 |
| WO | WO2015142676 A1 | 9/2015 |

OTHER PUBLICATIONS

Koponen et al., "Network Virtualization in Multitenant Data Centers", Apr. 2014, Usenix Symposium (Year: 2014).*

(Continued)

Primary Examiner — Jae Y Lee
Assistant Examiner — Aixa A Guadalupe Cruz
(74) Attorney, Agent, or Firm — Lee & Hayes, P.C.

(57) ABSTRACT

Apparatuses and methods include receiving, by a switch, a packet; creating, by the switch, one or more copies of the packet; selecting, by the switch, a plurality of servers; and separately forwarding, by the switch, the packet and the one or more copies to the plurality of servers.

17 Claims, 5 Drawing Sheets

(56) References Cited

U.S. PATENT DOCUMENTS

| | | | |
|---|---|---|---|
| 2014/0025986 A1* | 1/2014 | Kalyanaraman | G06F 11/2028 714/4.11 |
| 2014/0095924 A1* | 4/2014 | Holden | H04L 12/1868 714/4.11 |
| 2014/0192804 A1* | 7/2014 | Ghanwani | H04L 12/18 370/390 |
| 2015/0055651 A1* | 2/2015 | Shen | H04L 12/46 370/390 |
| 2015/0215405 A1 | 7/2015 | Baek et al. | |
| 2015/0227602 A1 | 8/2015 | Ramu et al. | |
| 2015/0280928 A1* | 10/2015 | Tessmer | H04L 12/4641 370/390 |
| 2016/0150047 A1 | 5/2016 | O'Hare et al. | |
| 2016/0285932 A1* | 9/2016 | Thyamagundalu | H04L 61/2069 |
| 2017/0353351 A1 | 12/2017 | Cheng et al. | |

OTHER PUBLICATIONS

Translation of International Search Report dated Mar. 20, 2020, from corresponding PCT Application No. PCT/CN2019/126621, 3 pages.
Translation of Written Opinion dated Mar. 20, 2020, from corresponding PCT Application No. PCT/CN2019/126621, 4 pages.

* cited by examiner

METHOD, APPARATUS, AND COMPUTER-READABLE STORAGE MEDIUM FOR NETWORK OPTIMIZATION OF CLOUD STORAGE SERVICE

BACKGROUND

For most cloud service providers, the data center network is a Clos network, which is a kind of multistage circuit switching network. Generally, when receiving a copy of data from a user, the cloud service server creates multiple copies of the received data and distributes the multiple copies to different servers. However, because multiple copies of data need to be distributed through the network, a heavy pressure is posed on the network connecting the storage servers. In addition, creating and sending multiple copies to the network will consume a significant amount of CPU power of the FrontEnd server.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
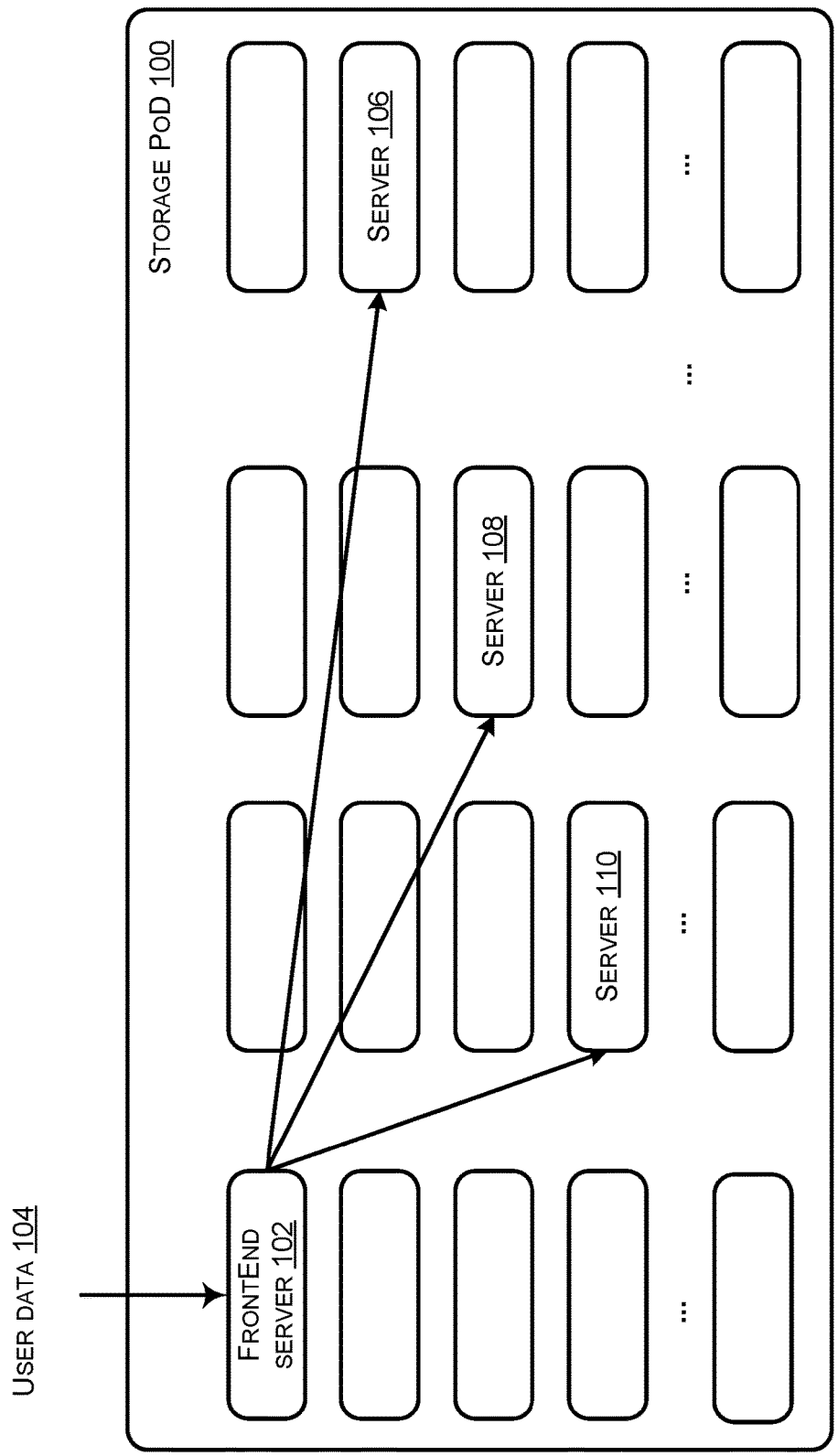
FIG. 1 illustrates an example block diagram of a storage Point of Delivery (PoD).

Apparatuses and methods discussed herein are directed to cloud storage service, and more specifically to networking optimization of cloud storage service.

A switch may receive a data packet from another party, for example, a sending server, a user device, a computing device, a process, an application, etc. The switch may determine whether a destination Internet Protocol (IP) address of the data packet is a reserved or designated IP address. Upon determining that the destination IP address of the data packet is the reserved or designated IP address, the switch may create one or more copies of the data packet. The switch may select a plurality of servers and forward the data packet and the one or more copies of the data packet to the plurality servers separately.

The one or more copies of the data packet may include a predetermined number (e.g., 1, 2, 3, 4, . . . , etc.) of copies of the data packet that is set in advance according to requirements of the cloud storage service. Example requirements include a data storage requirement, a data reliability requirement, a data availability requirement, etc.

The predetermined number of copies may include a first copy having a first destination IP address, a second copy having a second destination IP address, a third copy having a third destination IP address, . . . , and an $n^{th}$ copy having an $n^{th}$ destination IP address, where n is the predetermined number.

The plurality of servers may include the predetermined number of servers, for example, a first server having a first server IP address, a second server having a second server IP address, a third server having a third server IP address, . . . , and an $n^{th}$ server having an $n^{th}$ server IP address where n is the predetermined number, which may be any positive integer such as 1, 2, 3, etc.

The switch may replace the first destination IP address of the first copy using the first server IP address, the second destination IP address of the second copy using the second server IP address of the second server, the third destination IP address of the third copy using the third server IP address, . . . , and the $n^{th}$ destination IP address of the $n^{th}$ copy using the $n^{th}$ server IP address.

The selection of the plurality of servers may be performed randomly, in a rotating manner, using a hash function, or based on any other suitable criteria. For example, idle servers, servers with high capacities, servers that are not busy, etc. may be selected.

The first server may receive the first copy from the switch and send an acknowledgement message (ACK) to the switch. The second server may receive the second copy from the switch and send an ACK to the switch. The $n^{th}$ server may receive the $n^{th}$ copy from the switch and send an ACK to the switch.

The switch may create an $(n+1)^{th}$ copy of the packet if the switch does not receive the ACK from the any of the plurality servers within a predetermined period. The additional copy may include a $(n+1)^{th}$ destination IP address.

The switch may select an $(n+1)^{th}$ server having a an $(n+1)^{th}$ server IP address and replace the $(n+1)^{th}$ destination IP address of the $(n+1)^{th}$ copy using the $(n+1)^{th}$ server IP address and forward the $(n+1)^{th}$ copy to the $(n+1)^{th}$ server.

FIG. 1 illustrates an example block diagram of a storage PoD 100, which may be a module of network, compute, storage, and application components that work together to deliver networking services. Referring to FIG. 1, when a FrontEnd server 102 for cloud storage service receives data 104 from a user (not shown), the FrontEnd server 102 may create a predetermined number of copies of the data 104 and pick a predetermined number of servers in the same storage PoD 100, for example, servers 106, 108, and 110. Though three servers are picked in this example, other number of servers may be picked. The FrontEnd server 102 may save one copy on each of the selected servers 106, 108, and 110. If one server is down, the user data may be found on other servers. For example, the server 106 may fail, crash, be too busy to respond, etc., the user data may be available on servers 108 and 110. In case of a single server or a single rack failure, the user data still can be recovered, thereby improving the availability of data.

Figure 2:
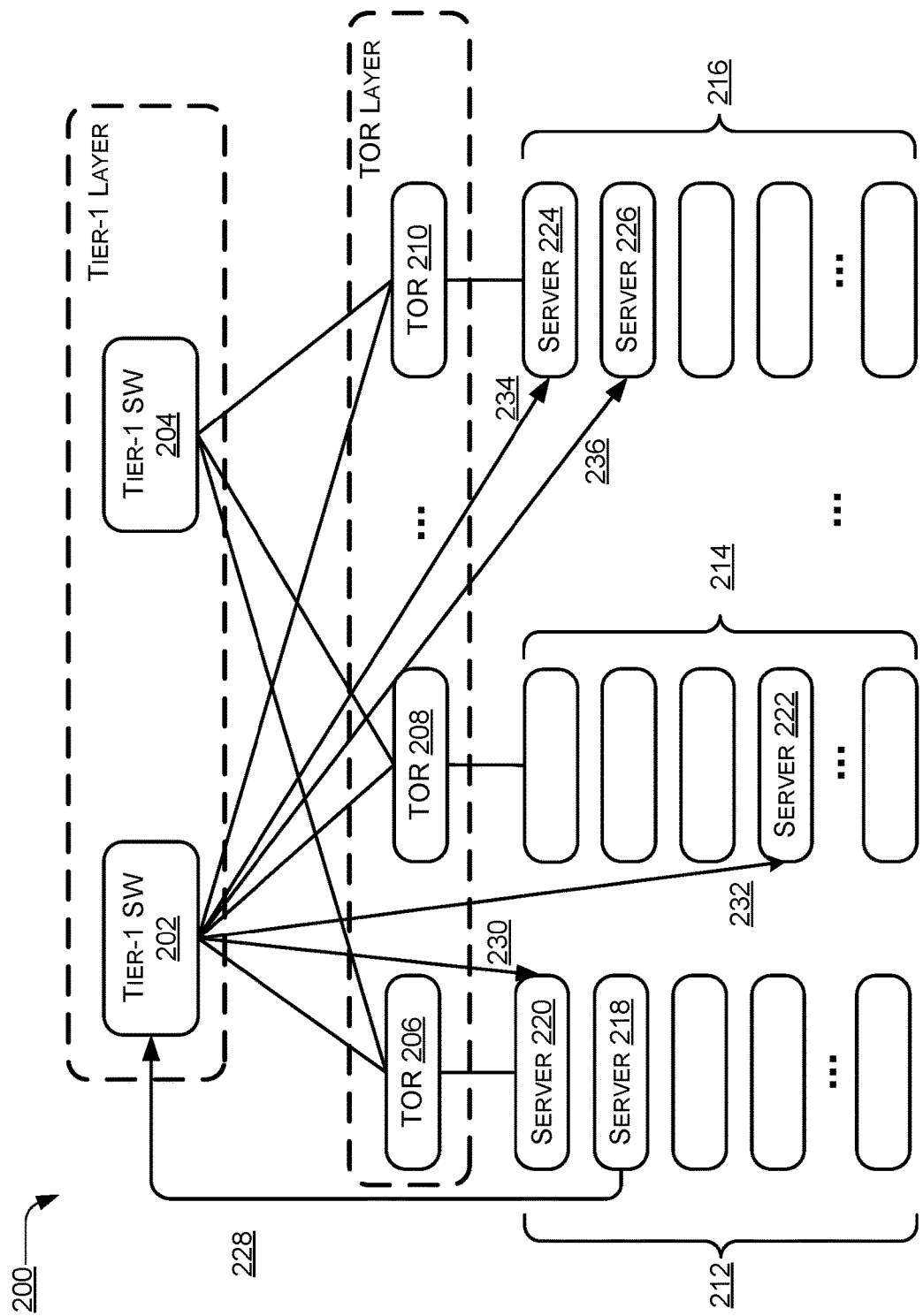
FIG. 2 illustrates an example block diagram of a Clos data center network.

FIG. 2 illustrates an example block diagram of a data center network 200, where multiple layers of switches are used to connect all servers. Though FIG. 2 shows two layers of switches, i.e., a Tier-1 layer and a top of rack (TOR) layer, there may be other layers. The tier-1 layer may also be referred as the top layer. The data center network 200 may be a Clos network or any suitable types of network.

The IP address range of storage servers in a PoD may be represented by a subnet A.B.C.D/E, where E may be the subnet mask length. The last IP address in the IP address range may be referred to as a special IP address, i.e., the replication IP address. For example, if the server subnet of the whole PoD is 192.168.0.0/24, the last IP address 192.168.0.255 may be reserved as the replication IP address. The replication IP address may be reserved internally without being assigned to any server. Additionally or alternatively, one or more other IP addresses within the IP address range may be reserved as replication IP address(es).

Referring to FIG. 2, the Tier-1 layer may include a Tier-1 SW 202 and a Tier-1 SW 204. The Tier-1 SW 202 and the Tier-1 SW 204 may be implemented as programmable switches to introduce a new network protocol which may not be realized by an existing black box switch. The switch ASIC (not shown) in the Tier-1 SW 202 and the Tier-1 SW 204 may be able to create the predetermined number of copies of data packets without consuming the CPU resource. Though FIG. 2 shows two Tier-1 switches, the Tier-1 layer may include other number of switches.

The TOR layer may include a TOR 206, a TOR 208, and a TOR 210. Though FIG. 2 shows three TORs, the TOR layer may include other number of TORs. The Tier-1 SW 202 may be coupled to the TOR 206, the TOR 208, and the TOR 210. The Tier-1 SW 204 may also be coupled to the TOR 206, the TOR 208, and the TOR 210.

The TOR 206 may be coupled to each server of a rack 212. The TOR 208 may be coupled to each server of a rack 214. The TOR 210 may be coupled to each server of a rack 216. Another party, for example, a sending server, a user device, a computing device, a process, an application, etc. may send data to the system 200. A sending server 218 and a first server 220 may be in the rack 212. A second server 222 may be in the rack 214. A third server 224 and a fourth server 226 may be in the rack 216.

An arrow 228 presents that the sending server 218 may send one or more packets to the Tier-1 SW 202. For example, the sending server 218 in the rack 212 or a party outside the network 200 may receive data from a user (not shown), and the sending server 218 may encapsulate the user data into an original packet to be sent to the Tier-1 SW 202. Additionally or alternatively, the user data may be encapsulated by the sending party, for example, a user device, a computing device, a process, an application, etc. The original packet may include a source address and a destination address, where the source address may be the IP address of the sending server 218 and the destination address may be the reserved IP address, for example, 192.168.0.255, which may be the replication IP address. Because the reserved IP address 192.168.0.255 may not be assigned to any server, the original packet from the sending server 218 with the reserved IP address as the destination IP address may be routed to one of the top layer switches in the Clos network 200, for example, the Tier-1 SW 202.

The Tier-1 SW 202 may identify the original packet as to be copied if the destination IP address of the packet is determined as the reserved IP address. The Tier-1 SW 202 may create a predetermined number of copies. The predetermined number may be set in advance according to requirements of the cloud storage service. Example requirements may include a data storage requirement, a data reliability requirement, a data availability requirement, etc.

The predetermined number of copies may include a first copy, a second copy, a third copy, . . . , and an $n^{th}$ copy, where n is the predetermined number. Thus, each of the predetermined number of copies may be the same as the original packet sent from the sending party, for example, the sending server 218. Each of the predetermined number of copies may have the same source IP address and the same destination IP address as the original packet. The destination IP address of the first copy may be referred to as the first destination IP address. The destination IP address of the second copy may be referred to as the second destination IP address. The destination IP address of the third copy may be referred to as the third destination IP address. The destination IP address of the $n^{th}$ copy may be referred to as the $n^{th}$ destination IP address, where n is the predetermined number.

The Tier-1 SW 202 may select the predetermined number of servers in the PoD. For example, the first server 220 in the rack 212, the second server 222 in the rack 214, and the third server 224 in the rack 216, . . . , an $n^{th}$ server (not shown) may be selected. The selected servers may be in different racks or the same rack. The selection of the predetermined number of servers may be performed by the Tier-1 SW 202 randomly, in a rotating manner, using a hash function, or based on any other suitable criteria. For example, idle servers, servers with high capacities, servers that are not busy, etc. may be selected. Moreover, the reserved IP address, for example, 192.168.0.255, may be exempted from the selection because the reserved IP address may be used as an indicator for the Tier-1 SW to generate predetermined number of copies of the original packet.

The Tier-1 SW 202 may replace the destination IP address of each of the predetermined number of copies using the IP address of each of the selected predetermined number of servers. For example, the Tier-1 SW 202 may replace the first destination IP address of the first copy using an IP address of the first server 220. The Tier-1 SW 202 may replace the second destination IP address of the second copy using an IP address of the second server 222. The Tier-1 SW 202 may replace the third destination IP address of the third copy using an IP address of the third cloud storage server 224. The Tier-1 SW 202 may replace the $n^{th}$ destination IP address of the $n^{th}$ copy using an IP address of the $n^{th}$ cloud storage server 224.

An arrow 230 represents that the Tier-1 SW 202 may route the first copy to the first server 220, for example, through the TOR 206. The TOR 206 may receive the first copy from the Tier-1 SW 202 and identify the first destination IP address of the first copy as the destination IP address of the first server 220 and forward the first copy to the first server 220.

The arrow 232 represents that the Tier-1 SW 202 may route the second copy to the second server 222, for example, through the TOR 208. The TOR 208 may receive the second copy from the Tier-1 SW 202 and identify the second destination IP address of the second copy as the destination IP address of the second server 222 and forward the second copy to the second server 222.

The arrow 234 may represent that the Tier-1 SW 202 may route the third copy to the third server 224, for example, through the TOR 210. The TOR 210 may receive the third copy from the Tier-1 SW 202 and identify the third destination IP address of the third copy as the destination IP address of the third server 224 and forward the third copy to the third server 224.

Though three arrows 230, 232, and 234 are described in this example, other arrows may be added to represent that the Tier-1 SW 202 may forward the $n^{th}$ copy to the $n^{th}$ server.

In case of failure of any of the selected predetermined number of servers, for example, the first server 220 may fail, crash, be too busy to respond, etc., the attempt of routing the first copy to the first server may be unsuccessful. The Tier-1 SW 202 may generate an $(n+1)^{th}$ copy of the original packet, select a $(n+1)^{th}$ server from the same PoD, and route the $(n+1)^{th}$ copy to a $(n+1)^{th}$ server 226, where n is the predetermined number. The $(n+1)^{th}$ copy may have the same source IP address and the same destination IP address as the original packet. The destination IP address of the $(n+1)^{th}$ copy may be referred to as the $(n+1)^{th}$ destination IP address. The selection of the $(n+1)^{th}$ server by the Tier-1 SW 202 may be performed randomly, in a rotating manner, using a hash function, or based on any other suitable criteria. For example, idle servers, servers with high capacities, servers that are not busy, etc. may be selected. Moreover, the reserved IP address, for example, 192.168.0.255, may be exempted from the selection because the reserved IP address may be used as an indicator for the Tier-1 SW to generate predetermined number of copies of the original packet. The Tier-1 SW 202 may replace the $(n+1)^{th}$ destination IP address of the $(n+1)^{th}$ copy using an IP address of the $(n+1)^{th}$ server 226.

An arrow 236 represents that the Tier-1 SW 202 may route the $(n+1)^{th}$ copy to the $(n+1)^{th}$ server 226, for example, through the TOR 210. The TOR 210 may receive the $(n+1)^{th}$ copy from the Tier-1 SW 202 and identify the $(n+1)^{th}$ destination IP address of the $(n+1)^{th}$ copy as the destination IP address of the $(n+1)^{th}$ server 224 and forward the $(n+1)^{th}$ copy to the $(n+1)^{th}$ server 226.

Figure 3A:
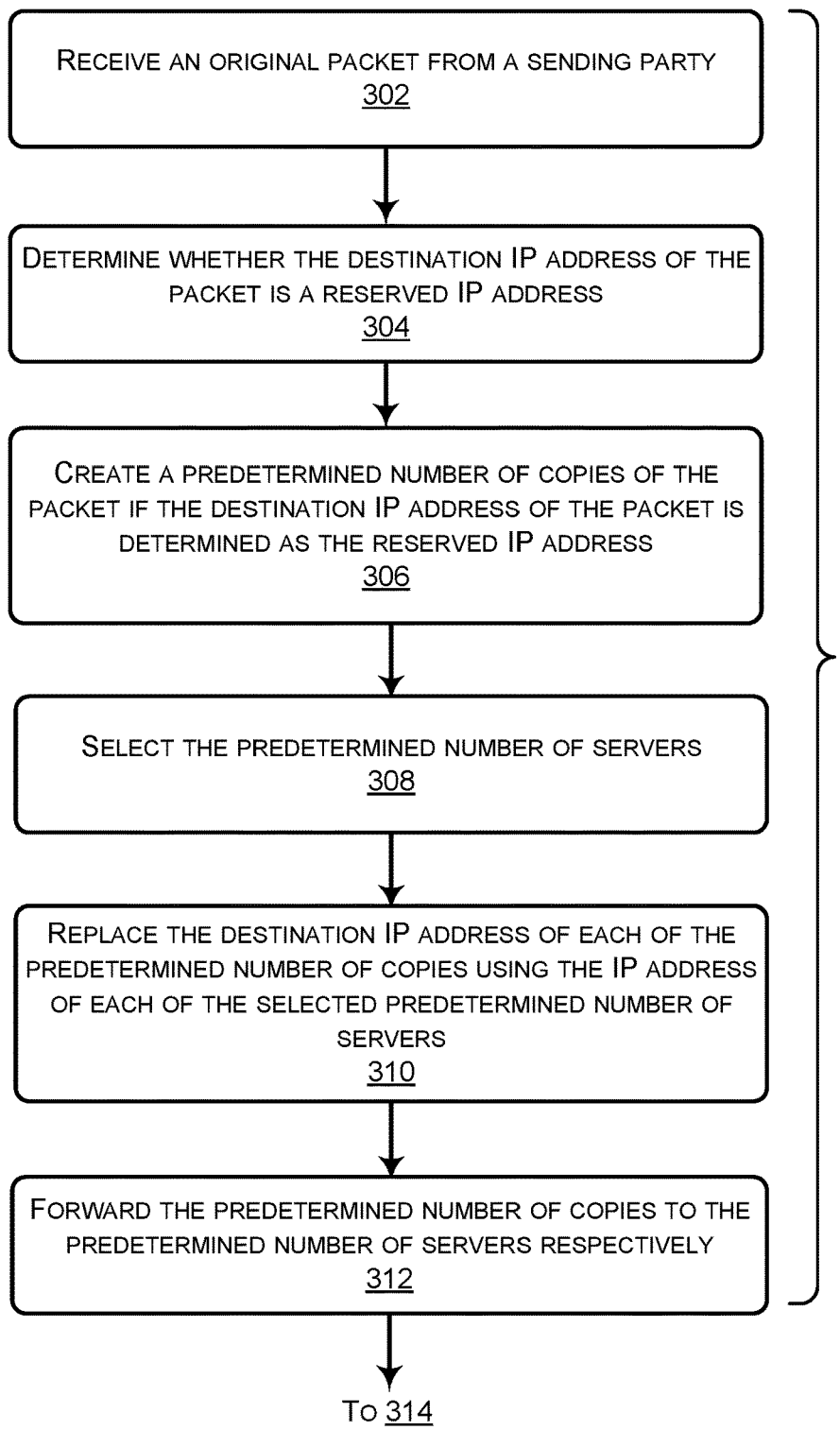
FIGS. 3A and 3B illustrate an example process for network optimization of cloud storage service.
Figure 3B:
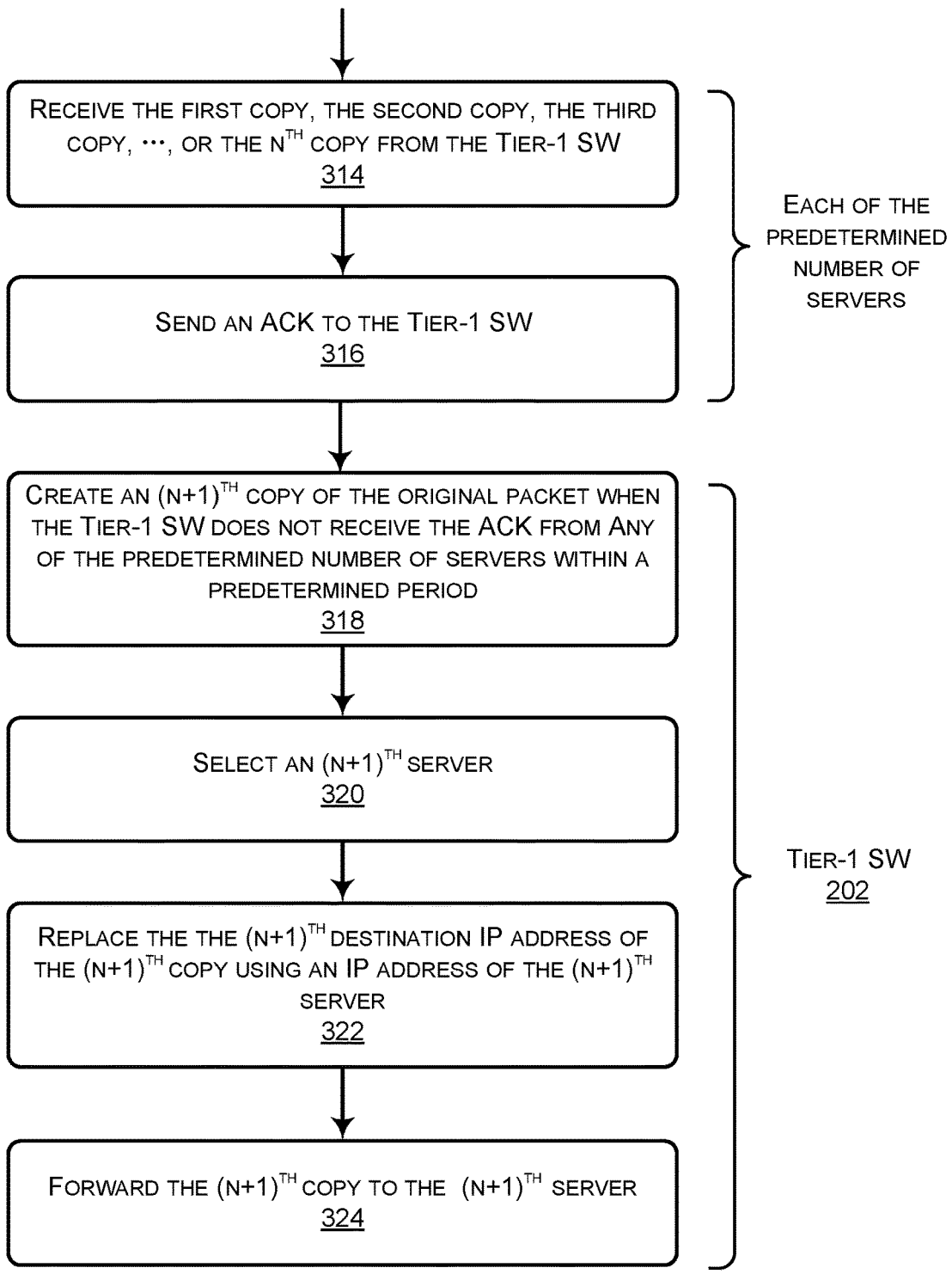

FIGS. 3A and 3B illustrate example flowcharts of a process 300 for network optimization of cloud storage service. Referring to FIGS. 3A and 3B, the process 300 may include the following.

At block 302, the Tier-1 SW 202 may receive the original packet from a sending party, for example, the sending server 218, a user device, a computing device, a process, an application, etc. Also referring to FIG. 2, the sending server 218 in the rack 212 or a party outside the network 200 may receive data from a user (not shown), and the sending server 218 may encapsulate the user data into an original packet to be sent to the Tier-1 SW 202. Additionally or alternatively, the user data may be encapsulated by the sending party, for example, a user device, a computing device, a process, an application, etc. The original packet may include a source address and a destination address, where the source address may be the IP address of the sending server 218 and the destination address may be the reserved IP address, for example, 192.168.0.255, which may be the replication IP address. Because the reserved IP address 192.168.0.255 may not be assigned to any server, the original packet from the sending server 218 with the reserved IP address as the destination IP address may be routed to one of the top layer switches in the Clos network 200, for example, the Tier-1 SW 202.

At block 304, the Tier-1 SW 202 may determine whether the destination IP address of the original packet is a reserved IP address. The Tier-1 SW 202 may identify the original packet as to be copied if the destination IP address of the packet is determined as the reserved IP address.

At block 306, the Tier-1 SW 202 may create a predetermined number of copies. The predetermined number may be set in advance according to requirements of the cloud storage service. Example requirements may include a data storage requirement, a data reliability requirement, a data availability requirement, etc.

The predetermined number of copies may include a first copy, a second copy, a third copy, . . . , and an $n^{th}$ copy, where n is the predetermined number. Thus, each of the predetermined number of copies may be the same as the original packet sent from the sending party, for example, the sending server 218. Each of the predetermined number of copies may have the same source IP address and the same destination IP address as the original packet. The destination IP address of the first copy may be referred to as the first destination IP address. The destination IP address of the second copy may be referred to as the second destination IP address. The destination IP address of the third copy may be referred to as the third destination IP address. The destination IP address of the $n^{th}$ copy may be referred to as the $n^{th}$ destination IP address, where n is the predetermined number.

At block 308, The Tier-1 SW 202 may select the predetermined number of servers. The selected servers may be in different racks or the same rack. The selection of servers may be performed by the Tier-1 SW 202 randomly, in a rotating manner, using a hash function, or based on any other suitable criteria. For example, idle servers, servers with high capacities, servers that are not busy, etc. may be selected. Moreover, the reserved IP address, for example, 192.168.0.255, may be exempted from the selection because the reserved IP address may be used as an indicator for the Tier-1 SW to generate predetermined number of copies of the original packet.

At block 310, The Tier-1 SW 202 may replace the destination IP address of each of the predetermined number of copies using the IP address of each of the selected predetermined number of servers. Also referring to FIG. 2, the Tier-1 SW 202 may replace the first destination IP address of the first copy using an IP address of the first server 220. The Tier-1 SW 202 may replace the second destination IP address of the second copy using an IP address of the second server 222. The Tier-1 SW 202 may replace the third destination IP address of the third copy using an IP address of the third cloud storage server 224. The Tier-1 SW 202 may replace the $n^{th}$ destination IP address of the $n^{th}$ copy using an IP address of the $n^{th}$ cloud storage server 224.

At block 312, the Tier-1 SW 202 may forward the predetermined number of copies to the predetermined number of servers respectively. Also referring to FIG. 2, the Tier-1 SW 202 may route the first copy to the first server 220, for example, through the TOR 206. The TOR 206 may receive the first copy from the Tier-1 SW 202 and identify the first destination IP address of the first copy as the destination IP address of the first server 220 and forward the first copy to the first server 220. The Tier-1 SW 202 may route the second copy to the second server 222, for example, through the TOR 208. The TOR 208 may receive the second copy from the Tier-1 SW 202 and identify the second destination IP address of the second copy as the destination IP address of the second server 222 and forward the second copy to the second server 222. The Tier-1 SW 202 may route the third copy to the third server 224, for example, through the TOR 210. The TOR 210 may receive the third copy from the Tier-1 SW 202 and identify the third destination IP address of the third copy as the destination IP address of the third server 224 and forward the third copy to the third server 224. The Tier-1 SW 202 may forward the $n^{th}$ copy to the $n^{th}$ server.

After receiving each of the predetermined number of copies, each of the selected predetermined number of servers may send an acknowledgment message (ACK) back to the Tier-1 SW 202 to confirm that the copy has been received. Therefore, after the block 312, the process 300 may further include the following as shown in FIG. 3B.

Referring to FIG. 3B, at block 314, each of the predetermined number of servers may receive the first copy, the second copy, the third copy, . . . , or the $n^{th}$ copy from the Tier-1 SW. For example, the first server 220 may receive the first copy from the Tier-1 SW 202. The second server 222 may receive the second copy from the Tier-1 SW 202. The third server 224 may receive the third copy from the Tier-1 SW 202. The $n^{th}$ server may receive the $n^{th}$ copy from the Tier-1 SW 202.

At block 316, each of the predetermined number of servers may send an ACK to the Tier-1 SW 202. For example, the first server 220 may send an ACK to the Tier-1 SW 202. The second server 222 may send an ACK to the Tier-1 SW 202. The third server 224 may send an ACK to the Tier-1 SW 202. The $n^{th}$ server may send an ACK to the Tier-1 SW 202.

In case of failure of any of the selected predetermined number of servers, for example, the server may fail, crash, be too busy to respond, etc., the server may not be able to send the ACK back to the Tier-1 SW 202. Without receiving the ACK within a certain period, the Tier-1 SW 202 may fall back to a previous step of generating copies of the original packet and sending the copies to other servers.

At block 318, the Tier-1 SW 202 may create an $(n+1)^{th}$ copy of the original packet if the Tier-1 SW 202 does not receive the ACK from the any of the selected predetermined number of servers within a predetermined period. The predetermined period may be set as necessary. The $(n+1)^{th}$ copy may have the same source IP address and the same destination IP address as the original packet. The destination IP address of the fourth copy may be referred to as the $(n+1)^{th}$ destination IP address.

At block 320, the Tier-1 SW 202 may select an $(n+1)^{th}$ server 226. The selection of the $(n+1)^{th}$ server by the Tier-1 SW 202 may be performed by the Tier-1 SW 202 randomly, in a rotating manner, using a hash function, or based on any other suitable criteria. For example, idle servers, servers with high capacities, servers that are not busy, etc. may be selected. Moreover, the reserved IP address, for example, 192.168.0.255, may be exempted from the selection because the reserved IP address may be used as an indicator for the Tier-1 SW to generate predetermined number of copies of the original packet.

At block 322, the Tier-1 SW 202 may replace the $(n+1)^{th}$ destination IP address of the $(n+1)^{th}$ copy using an IP address of the $(n+1)^{th}$ server 226.

At block 324, the Tier-1 SW 202 may forward the $(n+1)^{th}$ copy to the $(n+1)^{th}$ server. Also referring to FIG. 2, the Tier-1 SW 202 may route the $(n+1)^{th}$ copy to the $(n+1)^{th}$ server 226, for example, through the TOR 210. The TOR 210 may receive the $(n+1)^{th}$ copy from the Tier-1 SW 202 and identify the $(n+1)^{th}$ destination IP address of the $(n+1)^{th}$ copy as the destination IP address of the $(n+1)^{th}$ server 224 and forward the $(n+1)^{th}$ copy to the fourth server 226.

With systems and processes discussed herein, if one server is down, since there are copies of the data saved in other servers, the data may be recovered, thereby improving the availability of the cloud storage service.

Figure 4:
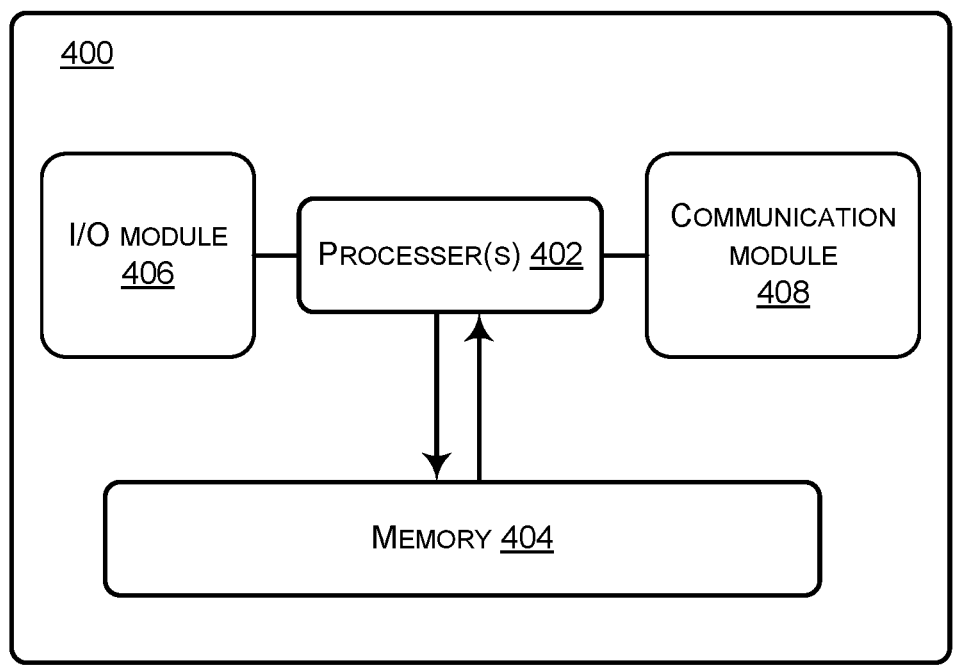
FIG. 4 illustrates an example block diagram of an apparatus for optimizing cloud storage service.

FIG. 4 illustrates an example block diagram of an apparatus 400 for optimizing cloud storage service.

FIG. 4 is only one example of an apparatus 400 and is not intended to suggest any limitation as to the scope of use or functionality of any computing device utilized to perform the processes and/or procedures described above. Other well-known computing devices, apparatuses, environments and/or configurations that may be suitable for use with the embodiments include, but are not limited to, driver/passenger computers, server computers, hand-held or laptop devices, multiprocessor apparatuses, microprocessor-based apparatuses, set-top boxes, game consoles, programmable consumer electronics, network PCs, minicomputers, mainframe computers, distributed computing environments that include any of the above apparatuses or devices, implementations using field programmable gate arrays ("FPGAs") and application specific integrated circuits ("ASICs"), and/or the like.

The apparatus 400 may include one or more processors 402 and memory 404 communicatively coupled to the processor(s) 402. The processor(s) 402 may execute one or more modules and/or processes to cause the processor(s) 402 to perform a variety of functions. In some embodiments, the processor(s) 402 may include a central processing unit (CPU), a graphics processing unit (GPU), both CPU and GPU, or other processing units or components known in the art. Additionally, each of the processor(s) 402 may possess its own local memory, which also may store program modules, program data, and/or one or more operating apparatuses.

Depending on the exact configuration and type of the apparatus 400, the memory 404 may be volatile, such as RAM, non-volatile, such as ROM, flash memory, miniature hard drive, memory card, and the like, or some combination thereof. The memory 404 may include computer-executable instructions that are executable by the processor(s) 402, when executed by the processor(s) 402, cause the processor(s) 402 to implement systems and processes described with reference to FIGS. 1-3.

The apparatus 400 may additionally include an input/output (I/O) interface 406 for receiving and outputting data. The apparatus 400 may also include a communication module 408 allowing the apparatus 400 to communicate with other devices (not shown) over a network (not shown). The network may include the Internet, wired media such as a wired network or direct-wired connections, and wireless media such as acoustic, radio frequency (RF), infrared, and other wireless media.

With systems and processes discussed herein, a sending server only needs to send out the original packet through the network once. Thus, the CPU power of the sending server may be saved. Because the packet may be copied by a top layer switch, for example, Tier-1 SW rather than the sending server, the network load and cost may be reduced significantly.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

1. A method comprising: receiving, by a switch, a packet; creating, by the switch, one or more copies of the packet; selecting, by the switch, a plurality of servers; and separately forwarding, by the switch, the packet and the one or more copies to the plurality of servers.

Clause 2. The method of clause 1, wherein prior to creating by the switch the one or more copies of the packet, the method further comprises determining, by the switch, whether a destination Internet Protocol (IP) address of the packet is a reserved IP address, and wherein the switch creates the one or more copies of the packet upon determining that the destination IP address of the packet is the reserved IP address.

Clause 3. The method of clause 1, wherein the plurality of servers includes a predetermined number of servers, the predetermined number being determined based on a particular policy.

Clause 4. The method of clause 3, further comprising replacing, by the switch, destination IP addresses of the packet and the one or more copies of the packet by respective server IP addresses of the plurality of servers.

Clause 5. The method of clause 1, wherein selecting by the switch the plurality of servers comprises selecting the plurality of servers randomly.

Clause 6. The method of clause 1, further comprising receiving, by the switch, an acknowledgement message (ACK) from a first server of the plurality of servers.

Clause 7. The method of clause 1, further comprising: creating, by the switch, an additional copy of the packet if the switch does not receive an acknowledgement message (ACK) from a first server of the plurality of servers within a predetermined period; selecting, by the switch, a new server; and forwarding, by the switch, the additional copy to the new server.

Clause 8. An apparatus, comprising: one or more processors; a memory coupled to the one or more processors, the memory storing computer-readable instructions executable by the one or more processors that when executed by the one or more processors, cause the one or more processors to perform acts comprising: receiving, by a switch, a packet; creating, by the switch, one or more copies of the packet; selecting, by the switch, a plurality of servers; and separately forwarding, by the switch, the packet and the one or more copies to the plurality of servers.

Clause 9. The apparatus of clause 8, wherein prior to creating by the switch the one or more copies of the packet, the acts further comprise determining, by the switch, whether a destination Internet Protocol (IP) address of the packet is a reserved IP address, and wherein the switch creates the one or more copies of the packet upon determining that the destination IP address of the packet is the reserved IP address.

Clause 10. The apparatus of clause 8, wherein a predetermined number of servers, the predetermined number being determined based on a particular policy.

Clause 11. The apparatus of clause 10, wherein the acts further comprise replacing, by the switch, destination IP addresses of the packet and the one or more copies of the packet by respective server IP addresses of the plurality of servers.

Clause 12. The apparatus of clause 8, wherein selecting by the switch the plurality of servers comprises selecting the plurality of servers randomly.

Clause 13. The apparatus of clause 8, wherein the acts further comprise receiving, by the switch, an acknowledgement message (ACK) from a first server of the plurality of servers.

Clause 14. The apparatus of clause 8, wherein the acts further comprise: creating, by the switch, an additional copy of the packet if the switch does not receive an acknowledgement message (ACK) from a first server of the plurality of servers within a predetermined period; selecting, by the switch, a new server; and forwarding, by the switch, the additional copy to the new server.

Clause 15. A computer-readable storage medium storing computer-readable instructions executable by one or more processors, that when executed by the one or more processors, cause the one or more processors to perform acts comprising: receiving, by a switch, a packet; creating, by the switch, one or more copies of the packet; selecting, by the switch, a plurality of servers; and separately forwarding, by the switch, the packet and the one or more copies to the plurality of servers.

Clause 16. The computer-readable storage medium of clause 15, wherein prior to creating by the switch the one or more copies of the packet, the acts further comprise determining, by the switch, whether a destination Internet Protocol (IP) address of the packet is a reserved IP address, and wherein the switch creates the one or more copies of the packet upon determining that the destination IP address of the packet is the reserved IP address.

Clause 17. The computer-readable storage medium of clause 15, wherein a predetermined number of servers, the predetermined number being determined based on a particular policy.

Clause 18. The computer-readable storage medium of clause 17 wherein the acts further comprise replacing, by the switch, destination IP addresses of the packet and the one or more copies of the packet by respective server IP addresses of the plurality of servers.

Clause 19. The computer-readable storage medium of clause 15, wherein selecting by the switch the plurality of servers comprises selecting the plurality of servers randomly.

Clause 20. The computer-readable storage medium of clause 15, wherein the acts further comprise receiving, by the switch, an acknowledgement message (ACK) from a first server of the plurality of servers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for improving data availability of cloud storage service, comprising:
   receiving, by a switch, a packet;
   determining, by the switch, whether a destination Internet Protocol (IP) address of the packet is a reserved IP address, wherein the reserved IP address is an indicator that one or more copies of the packet need to be generated;
   creating, by the switch, one or more copies of the packet upon determining that the destination IP address of the packet is the reserved IP address;
   selecting, by the switch, a plurality of servers; and
   separately forwarding, by the switch, the packet and the one or more copies to the plurality of servers to save the packet and the one or more copies on the plurality of servers such that in case of a server failure, data of the packet can be recovered from at least one of the plurality of servers.

2. The method of claim 1, wherein the plurality of servers includes a predetermined number of servers, the predetermined number being determined based on a particular policy.

3. The method of claim 2, further comprising replacing, by the switch, destination IP addresses of the packet and the one or more copies of the packet by respective server IP addresses of the plurality of servers.

4. The method of claim 1, wherein selecting by the switch the plurality of servers comprises selecting the plurality of servers randomly.

5. The method of claim 1, further comprising receiving, by the switch, an acknowledgement message (ACK) from a first server of the plurality of servers.

6. The method of claim 1, further comprising:
   creating, by the switch, an additional copy of the packet if the switch does not receive an acknowledgement message (ACK) from a first server of the plurality of servers within a predetermined period;
   selecting, by the switch, a new server; and
   forwarding, by the switch, the additional copy to the new server.

7. An apparatus for improving data availability of cloud storage service, comprising:
   one or more processors;
   a memory coupled to the one or more processors, the memory storing computer-readable instructions executable by the one or more processors that when executed by the one or more processors, cause the one or more processors to perform acts comprising:
      receiving, by a switch, a packet;
      determining, by the switch, whether a destination Internet Protocol (IP) address of the packet is a reserved IP address, and wherein the reserved IP address is an indicator that one or more copies of the packet need to be generated;
      creating, by the switch, one or more copies of the packet upon determining that the destination IP address of the packet is the reserved IP address;
      selecting, by the switch, a plurality of servers; and
      separately forwarding, by the switch, the packet and the one or more copies to the plurality of servers to save the packet and the one or more copies on the plurality of servers such that in case of a server failure, data of the packet can be recovered from at least one of the plurality of servers.

8. The apparatus of claim 7, wherein a predetermined number of servers, the predetermined number being determined based on a particular policy.

9. The apparatus of claim 8, wherein the acts further comprise replacing, by the switch, destination IP addresses of the packet and the one or more copies of the packet by respective server IP addresses of the plurality of servers.

10. The apparatus of claim 7, wherein selecting by the switch the plurality of servers comprises selecting the plurality of servers randomly.

11. The apparatus of claim 7, wherein the acts further comprise receiving, by the switch, an acknowledgement message (ACK) from a first server of the plurality of servers.

12. The apparatus of claim 7, wherein the acts further comprise:
   creating, by the switch, an additional copy of the packet if the switch does not receive an acknowledgement message (ACK) from a first server of the plurality of servers within a predetermined period;
   selecting, by the switch, a new server; and
   forwarding, by the switch, the additional copy to the new server.

13. A computer-readable storage medium storing computer-readable instructions executable by one or more processors, that when executed by the one or more processors, cause the one or more processors to perform acts comprising:
   receiving, by a switch, a packet;
   determining, by the switch, whether a destination Internet Protocol (IP) address of the packet is a reserved IP address, wherein the reserved IP address is an indicator that one or more copies of the packet need to be generated;
   creating, by the switch, one or more copies of the packet upon determining that the destination IP address of the packet is the reserved IP address;
   selecting, by the switch, a plurality of servers; and
   separately forwarding, by the switch, the packet and the one or more copies to the plurality of servers to save the packet and the one or more copies on the plurality of servers such that in case of a server failure, data of the packet can be recovered from at least one of the plurality of servers.

14. The computer-readable storage medium of claim 13, wherein a predetermined number of servers, the predetermined number being determined based on a particular policy.

15. The computer-readable storage medium of claim 14 wherein the acts further comprise replacing, by the switch, destination IP addresses of the packet and the one or more copies of the packet by respective server IP addresses of the plurality of servers.

16. The computer-readable storage medium of claim 13, wherein selecting by the switch the plurality of servers comprises selecting the plurality of servers randomly.

17. The computer-readable storage medium of claim 13, wherein the acts further comprise receiving, by the switch, an acknowledgement message (ACK) from a first server of the plurality of servers.

\* \* \* \* \*